United States Patent
Dunham et al.

(10) Patent No.: US 11,494,184 B1
(45) Date of Patent: Nov. 8, 2022

(54) CREATION OF TRANSPORTABILITY CONTAINER FILES FOR SERVERLESS APPLICATIONS

(71) Applicant: Amazon Technologies, Inc., Seattle, WA (US)

(72) Inventors: Jeremiah M. Dunham, Hood River, OR (US); Fernando Francisco Dingler Avilez, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/036,754

(22) Filed: Sep. 29, 2020

(51) Int. Cl.
  *G06F 8/76* (2018.01)
  *G06F 8/41* (2018.01)
  *G06F 9/54* (2006.01)

(52) U.S. Cl.
  CPC ............... *G06F 8/76* (2013.01); *G06F 8/425* (2013.01); *G06F 9/542* (2013.01)

(58) Field of Classification Search
  None
  See application file for complete search history.

(56) References Cited

U.S. PATENT DOCUMENTS

| | | | |
|---|---|---|---|
| 7,043,637 B2 * | 5/2006 | Bolosky | H04L 9/3239 713/189 |
| 7,463,264 B2 * | 12/2008 | Harrison | G06Q 10/02 345/473 |
| 7,478,243 B2 * | 1/2009 | Bolosky | H04L 9/3247 713/181 |
| 8,447,829 B1 | 5/2013 | Geller et al. | |
| 2006/0080639 A1 | 4/2006 | Bustelo et al. | |
| 2010/0050151 A1 | 2/2010 | Balasubramanian et al. | |
| 2017/0142225 A1 | 5/2017 | Makhijani et al. | |
| 2017/0192758 A1 | 7/2017 | Apte et al. | |
| 2018/0115551 A1 * | 4/2018 | Cole | H04L 41/18 |
| 2019/0303564 A1 | 10/2019 | Kelly | |
| 2019/0332366 A1 * | 10/2019 | Natanzon | G06F 8/60 |
| 2019/0332483 A1 * | 10/2019 | Natanzon | G06F 16/2458 |
| 2020/0218634 A1 | 7/2020 | Jones et al. | |
| 2021/0157929 A1 | 5/2021 | Stottinger et al. | |

OTHER PUBLICATIONS

Jamshidi et al., "Microservices the Journey So Far and Challenges Ahead," IEEE, 2018, 12pg. (Year: 2018).*

(Continued)

*Primary Examiner* — Ryan D. Coyer
(74) *Attorney, Agent, or Firm* — BakerHostetler

(57) ABSTRACT

A lexical analyzer is provided to analyze serverless application code to help ensure that the serverless application is portable between different execution environments. The lexical analyzer may identify non-portable features of the application, and alerts of these features may be provided to users. A transfer tool may be provided to assist in transferring a serverless application between computing platforms, such as by converting the portable serverless application to a container format. An interface may be provided that subscribes, on behalf of a container, to receive notifications of triggering events from a computing platform's notification service. The interface may provide a message to the container to indicate an occurrence of a triggering event, which may trigger execution of a serverless function by the container.

19 Claims, 10 Drawing Sheets

(56) References Cited

OTHER PUBLICATIONS

Kaplan, Ayhan, "Framework for Migrating Deployed Serverless Applications," University of Stuttgart, 2019, 113pg. (Year: 2019).*
Mehta et al., "Calvin Constrained—A Framework for IoT Applications in Heterogeneous Environments," IEEE, 2017, 11pg. (Year: 2017).*
Baldini et al., "The Serverless Trilemma," ACM, 2017, 15pg. (Year: 2017).*
Buyya et al., "A Manifesto for Future Generation Cloud Computing: Research Directions for the Next Decade," Univ. Melbourne AUS, 2018, 51pg. (Year: 2018).*
Hall et al., An Execution Model for Serverless Functions at the Edge, 'ACM, 2019, 12pg. (Year: 2019).*
Kaplan; "Framework for Migrating Deployed Serverless Applications"; Institute of Architecture of Application Systems; Master Thesis; 2019; 113 pages.
Yussupov et al.; "SEAPORT: Assessing the Portability of Serverless Applications"; Proceedings of the 10$^{th}$ Int'l Conf. on Cloud Computing and Service Science; May 2020; p. 456-467.

* cited by examiner

CREATION OF TRANSPORTABILITY CONTAINER FILES FOR SERVERLESS APPLICATIONS

CROSS-REFERENCE TO RELATED APPLICATIONS

This application is related to the following application, which is hereby incorporated by reference in its entirety: U.S. patent application Ser. No. 17/036,620 filed Sep. 29, 2020, entitled "CREATING PORTABLE SERVERLESS APPLICATIONS". This application is also related to the following application, which is hereby incorporated by reference in its entirety: U.S. patent application Ser. No. 17/036,939 filed Sep. 29, 2020, entitled "EVENT LISTENER INTERFACE FOR CONTAINER-BASED EXECUTION OF SERVERLESS FUNCTIONS".

BACKGROUND

The popularity of serverless computing has increased rapidly in recent years. In serverless computing models, a computing resource provider, such as a cloud service provider, may run a server and may dynamically manage allocation of machine resources. One reason that serverless computing has gained popularity is that pricing may often be based on the amount of resources consumed by an application, for example as opposed to pre-purchased computing instances or other units of capacity. While many customers may find serverless architectures compelling, the customers may be hesitant to pursue serverless architectures because of perceived vendor lock-in and portability problems. One example of this is that, because serverless applications may often be created based on vendor-specific application programming interfaces (API's), there may be a perception that the use of these vendor-specific API's may prevent portability of a serverless application from one vendor to another. These and other perceived problems may sometimes dissuade customers from pursuing serverless applications that might otherwise be advantageous to the customers.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
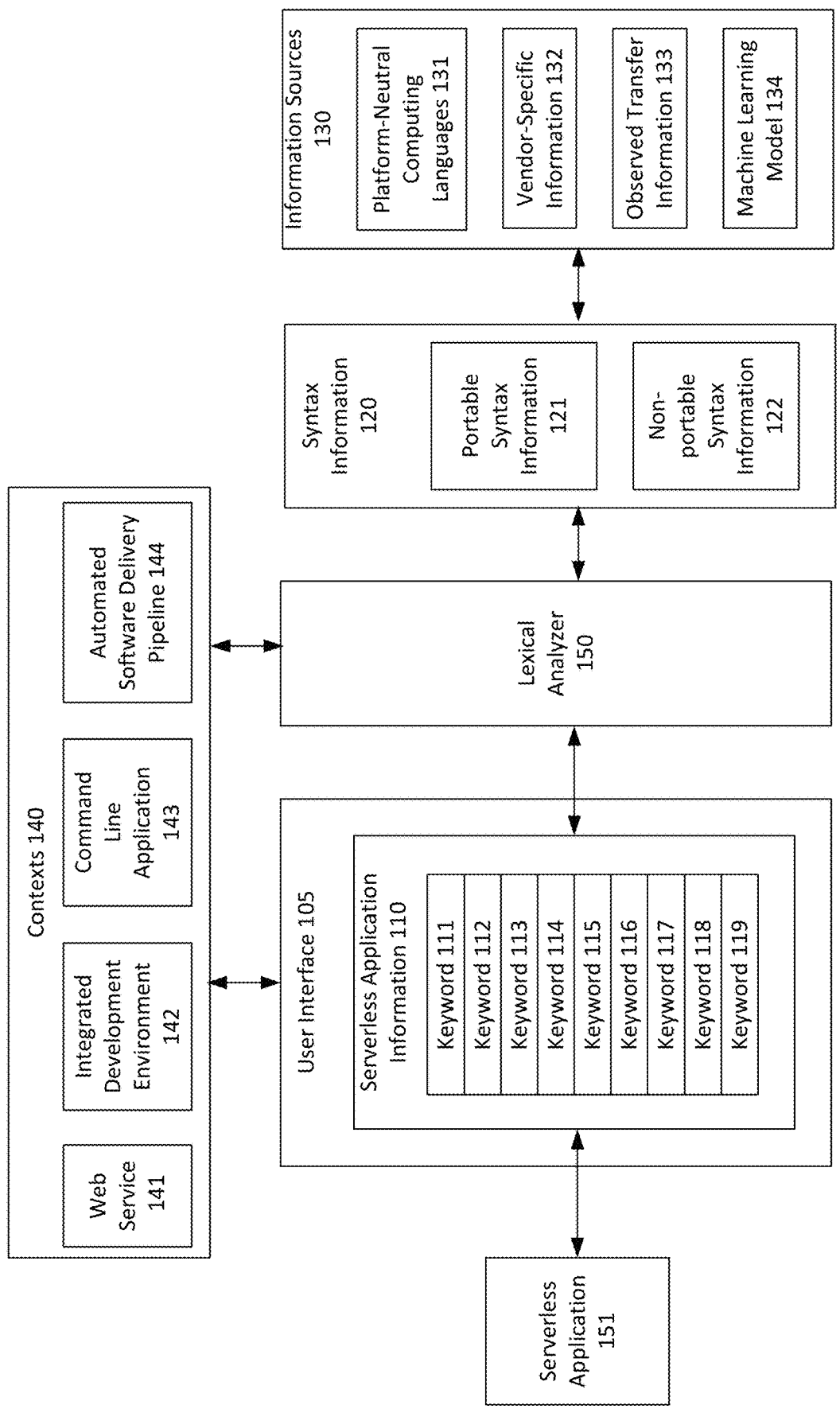
FIG. 1 is a diagram illustrating an example portable serverless application creation system that may be used in accordance with the present disclosure.

Techniques for creating and maintaining portable serverless applications are described herein. In some examples, a lexical analysis tool may be provided that may analyze information associated with a serverless application, such as application code, to help ensure that the serverless application is employing lexical features (e.g., keywords, identifiers, names, etc.) that are portable between different execution environments, such as between different vendors. The lexical analysis tool may similarly be employed to help ensure that the serverless application is not employing lexical features that are non-portable between different execution environments. The term portable, as used herein, refers to a platform-neutral lexical feature that is successfully executable in multiple different execution environments, such as different cloud service vendors. The term non-portable, as used herein, refers to a lexical feature that is successfully executable in only a single execution environment, such as a single cloud service vendor. In some examples, the lexical analysis tool may be employed in a variety of contexts. For example, the lexical analysis tool may be exposed as a web service and integrated into command-line applications and integrated development environments (IDEs) for analysis at various points in the development lifecycle. The lexical analysis tool may also be integrated with an automated software delivery pipeline, for example that is used for automated software build and automated deployments, such as to help to confirm that the application is portable before or during the build or deployment stages.

In some examples, the lexical analysis tool may have access to syntax information, which is information that indicates portability characteristics of lexical features between execution environments. A portability characteristic may include an indication of whether a lexical feature is portable or non-portable between execution environments. In some examples, the syntax information may include portable syntax information and/or non-portable syntax information. The portable syntax information may indicate lexical features (e.g., keywords, identifiers, names, etc.) that are portable between execution environments, such as between different cloud vendors. The portable syntax information may be compiled based on platform-neutral computing languages, such as PYTHON®, JAVA®, PERL® and others. In some cases, the portable syntax information may be compiled based on language references for the platform-neutral languages, standard library references for standard libraries of the platform-neutral languages, and other reference information for the platform-neutral languages and their libraries. For example, the language references and standard library references may be analyzed to determine lexical features of the platform-neutral languages. The lexical features of the platform-neutral languages may then be included in the portable syntax information.

By contrast, the non-portable syntax information may indicate lexical features that are non-portable between execution environments. The non-portable syntax information may be compiled based on information associated with vendor-specific computing syntaxes. For example, references that describe vendor-specific syntaxes may be analyzed to determine lexical features of the vendor-specific syntaxes, and these lexical features may then be included in the non-portable syntax information. In some examples, libraries that have system or platform-dependent implementations or semantics, such as those related to file processing, concurrent execution, and graphical user interfaces, may be excluded from the portable syntax information (and potentially included in the non-portable syntax information). By contrast, libraries that implement Internet protocols and data handling may be included in the portable syntax information (and potentially excluded from the non-portable syntax information).

Additionally, in some examples, the syntax information may be compiled based at least in part on one or more machine learning algorithms that receive feedback associated with execution environment transfer attempts. For example, a machine learning model may be trained based on inputs, such as code and other information about serverless applications as well as results of attempts to transfer those serverless applications between execution environments. In some cases, if a given serverless function is successfully transferred between execution environments, such that the serverless function successfully executes in the new environment, then the machine learning model may add lexical features of that function to the portable syntax information. By contrast, if a given serverless function is not successfully transferred between execution environments, for example such that the serverless function fails to execute in the new environment, then the machine learning model may add lexical features of that function to the non-portable syntax information.

The lexical analysis tool may, for example, parse the serverless application code to identify lexical features, such as keywords, used in the serverless application. The lexical analysis tool may then compare the identified lexical features from the serverless application with the syntax information. In some examples, if an identified lexical feature from the serverless application matches, or is otherwise indicated by, a lexical feature of the portable syntax information, then the lexical analysis tool may determine that the identified lexical feature is portable. For example, if an identified keyword in the serverless application code matches a keyword included in the portable syntax information, then the lexical analysis tool may determine that the identified keyword is portable. By contrast, if an identified lexical feature from the serverless application matches, or is otherwise indicated by, a lexical feature of the non-portable syntax information, then the lexical analysis tool may determine that the identified lexical feature is non-portable. For example, if an identified keyword in the serverless application code matches a keyword included in the non-portable syntax information, then the lexical analysis tool may determine that the identified keyword is non-portable.

The lexical analysis tool may provide indications of which lexical features of the serverless application are portable and/or non-portable. Feedback may then be provided to a user, for example via one or more user interfaces, to indicate which lexical features of the serverless application are portable and/or non-portable. For example, visual indications, such as highlighting, bold text, underlining, etc., may be provided to indicate which lexical features of the serverless application are portable and/or non-portable. In one specific example, keywords within the serverless application code that are non-portable may be indicated by highlighting those keywords in a listing or other display of the serverless application code. This feedback may, for example, assist in alerting developers when portions of the serverless application code are non-portable. In some examples, the developer may then attempt to replace these non-portable portions of the serverless application code with replacement code that is more likely to be portable between vendors. In some cases, the lexical analysis tool may provide a recommendation relating to replacement code that may be used, such as a recommendation of related keywords are other lexical features that are known to be portable. In yet other examples, the developer may choose to not to replace certain vendor-specific features that are indicated by the lexical analysis tool. In one specific example, when the lexical analysis tool indicates non-portable features of the code, the developer may choose to segregate the non-portable features in a common section of the code, such that the features may be easily identified and replaced at a later time if the serverless application is eventually moved to a different vendor.

Thus, the lexical analysis techniques described above may be employed to assist in creation of portable serverless applications. In additional to these lexical analysis techniques, various application transfer techniques are also described herein, such as to assist in transferring a portable serverless application between execution environments, for example from one vendor to another. Specifically, the application transfer techniques described herein may assist in exporting a portable serverless application to a container format, such as may allow the portable serverless application to be executed in association with multiple different cloud computing platforms, thereby allowing transfer of the portable serverless application between execution environments. Moreover, in some examples, the techniques described herein may assist in allowing a portable serverless application in a container format to execute in a container orchestration framework, thereby improving the efficiency of execution of the portable serverless application.

An application transfer tool may be provided that may assist in creating container files that represent the portable serverless application. In some examples, when a customer is ready to transfer a portable serverless application between execution environments, the customer may employ the application transfer tool to create the container files that implement the portable serverless application. In particular, the application transfer tool may create the container files based on a serverless application template corresponding to the serverless application. In some examples, the serverless application template may have a format that is specific to a cloud platform or other vendor in which the serverless application is currently executing. For example, AMAZON WEB SERVICES (AWS)® provides a serverless application template referred to as the Serverless Application Model (SAM) template. In some examples, the application transfer tool may create a plurality of containers to implement the portable serverless application, with each container being used to implement a respective serverless function of the serverless application. A container, as that term is used herein, is a computing instance that is isolated such that programs executing in a container see only the container's contents and resources assigned to the container.

The application transfer tool may read the serverless application template to identify definitions for serverless functions of the serverless application. A function definition may specify various properties of a respective serverless function, such as a runtime environment, source code information, function triggering events, memory requirements, environment variables, and others. The application transfer tool may then create a container file for the serverless function based at least in part on these definitions. For example, if a function definition specifies a given type of runtime environment (e.g., NodeJS, version 12), then the application transfer tool may employ a container image having the specified type of runtime environment as a base image for the container file. As another example, if a function definition specifies a given location (e.g., a directory named "app") in which a function's source code is located, then the application transfer tool may include a reference to the specified source code location in the container file. Additionally, the application transfer tool may identify function triggering events specified in the serverless application template and provide indications of these triggering events in the container file.

In addition to creation of container files for the serverless application, the application transfer tool may also assist in allowing a portable serverless application in a container format to execute in a container orchestration framework, such as the KUBERNETES® framework. Specifically, the application transfer tool may be employed to generate container orchestration framework manifest files for the serverless function containers. A manifest file is a file that assists in describing execution characteristics for a respective container in the context of a container orchestration framework. The manifest file may be written in a data serialization language. The manifest file may describe execution characteristics of a respective serverless function container, such as central processing unit (CPU) and other processing requirements, memory requirements, network configuration requirements, storage requirements, and other requirements of the container. In some examples, the memory requirements may be specified in the serverless application template and may be determined by the application transfer tool based on the serverless application template. The application transfer tool may infer processing requirements of the container based at least in part the memory, such as by allocating higher processing requirements to serverless functions with higher memory requirements, for example in a proportional or approximately proportional manner. In some examples, the application transfer tool may allocate a default storage value of 500 megabytes (MB) to the container, as this is a common storage value allocated for serverless functions. Additionally, in some examples, the application transfer tool may specify, in the manifest file, a network configuration, such as an indication of ports with which to communicate with the container, for example for purposes of invoking serverless functions.

The techniques described herein may also provide an interface that allows a container file to be notified of events that trigger execution of a serverless function. Specifically, various cloud computing platforms may provide event notification services that may provide notifications of these triggering events. Traditional serverless applications that are designed for a specific cloud computing platform may typically subscribe to an event notification service of that specific platform to receive notifications of triggering events. However, unlike traditional serverless applications that are designed for a specific cloud computing platform, the ability of a container to directly communicate with specific event notification services of specific computing platforms may be limited.

For these and other reasons, an interface may be provided that allows the container to be notified of triggering events. In some examples, the interface may include a platform-neutral component that communicates with the container. The interface may also include a first platform-specific component that communicates with an event notification service of a platform with which the container will directly and/or indirectly interact. Additionally, the interface may further include a second platform-specific component that corresponds to a native (i.e., pre-container) computing platform for which the serverless application was originally designed. The platform-specific components may plug-in, or otherwise connect, to the platform-neutral component. In some examples, multiple different platform-specific components may be developed for multiple different respective platforms, and selected platform-specific components may be picked from the multiple different available platform-specific components. Specifically, the first platform-specific component may enable communication between the interface and the specific platform with which the container will interact, while the second platform-specific component may match a native (i.e., pre-container) computing platform for which the serverless application was originally designed.

In some examples, the platform-neutral component may receive requests for event subscriptions from a container file. These requests may be in a platform-neutral format, such as a special custom format that corresponds to the platform-neutral component and not to any specific platform. The first platform-specific component may then, based on a subscription request, initiate a subscription to receive notifications regarding a given trigger event. The subscription may be made by the first platform-specific component to a platform-specific event notification service of the platform with which the container is interacting. When the triggering event occurs, a first platform-specific event message that indicates the occurrence of the triggering event may be sent from the platform-specific event notification service to the first platform-specific component. Upon receipt of the first platform-specific event message, the first platform-specific component may convert the platform-specific event message into a platform-neutral event message. The platform-neutral event message may be in a platform-neutral format, such as a special custom format that corresponds to the platform-neutral component and not to any specific platform. The second platform-specific component may then convert the platform-neutral event message to a second platform-specific event message corresponding to a second computing platform, such as a native (i.e., pre-container) computing platform for which the serverless application was originally designed The platform-neutral component may then provide the second platform-specific event message to the container. A respective serverless computing function within the serverless computing application may then be triggered based on the event.

FIG. 1 is a diagram illustrating an example portable serverless application creation system that may be used in accordance with the present disclosure. In the example of FIG. 1, serverless application information 110, from a serverless application 151, is displayed in a user interface 105. As will be described in greater detail below, a lexical analysis tool, lexical analyzer 150, may analyze the serverless application information 110 to assist in ensuring that the serverless application 151 is employing lexical features that are portable between different execution environments, such as between different vendors. The lexical analyzer 150 may similarly be employed to help ensure that the serverless application 151 is not employing lexical features that are non-portable between different execution environments.

In some examples, the lexical analyzer 150 and/or user interface 105 may be provided in a variety of contexts 140. For example, in some cases, the lexical analyzer may be exposed as a web service 141. In some examples, the lexical analyzer 150 may be integrated into an integrated development environment (IDE) 142 and/or a command line application 143. In these scenarios, the serverless application 151 may be undergoing application development, and the lexical analyzer 150 may be used at various points in the development lifecycle. In other examples, the lexical analyzer 150 may be integrated with an automated software delivery pipeline 144, for example that is used for automated software build and automated deployments, such as to help to confirm that the application is portable before or during the build or deployment stages. Similarly, in some examples, the user interface 105 may be provided by, or included in, the IDE 142, command line application 143, automated software delivery pipeline 144, and/or other contexts 140.

The lexical analyzer tool 150 accesses syntax information 120, which is information that indicates portability characteristics of lexical features between execution environments. A portability characteristic may include an indication of whether a lexical feature is portable or non-portable between execution environments. In the example of FIG. 1, syntax information 120 includes portable syntax information 121 and non-portable syntax information 122. The portable syntax information 121 indicates lexical features (e.g., keywords, identifiers, names, etc.) that are portable between execution environments, such as between different cloud vendors. By contrast, the non-portable syntax information 122 indicates lexical features that are non-portable between execution environments. The portable syntax information 121 and non-portable syntax information may be compiled based on various information sources 130. In the example of FIG. 1, the information sources 130 include platform-neutral computing languages 131, vendor-specific information 132, observed transfer information 133, and machine learning algorithm 134.

In some examples, the portable syntax information 121 may be compiled based at least in part on platform-neutral computing languages 131, such as PYTHON®, JAVA®, PERL® and others. Specifically, in some cases, the portable syntax information 121 may be compiled based on language references for the platform-neutral languages, standard library references for standard libraries of the platform-neutral languages, and other reference information for the platform-neutral languages and their libraries. For example, the language references and standard library references may be analyzed to determine lexical features of the platform-neutral languages. The lexical features of the platform-neutral languages may then be included in the portable syntax information.

Additionally, in some examples, the non-portable syntax information 122 may be compiled based on vendor-specific information 132, which includes information associated with vendor-specific computing syntaxes. For example, references that describe vendor-specific syntaxes may be analyzed to determine lexical features of the vendor-specific syntaxes, and these lexical features may then be included in the non-portable syntax information. In some examples, libraries that have system or platform-dependent implementations or semantics, such as those related to file processing, concurrent execution, and graphical user interfaces, may be excluded from the portable syntax information 121 (and potentially included in the non-portable syntax information 122). By contrast, libraries that implement Internet protocols and data handling may be included in the portable syntax information 121 (and potentially excluded from the non-portable syntax information 122).

Additionally, in some examples, a machine learning model 134, such as including one or more machine learning algorithms, may be trained based on various inputs, such as observed transfer information 133. In some examples, observed transfer information 133 may include code and other information about serverless applications as well as results of attempts to transfer those serverless applications between execution environments. For example, if a given serverless function is successfully transferred between execution environments, such that the serverless function successfully executes in the new environment, then the machine learning model 134 may add lexical features of that function to the portable syntax information 121. By contrast, if a given serverless function is not successfully transferred between execution environments, for example such that the serverless function fails to execute in the new environment, then the machine learning model 134 may add lexical features of that function to the non-portable syntax information 122.

The lexical analyzer 150 may parse serverless application information 110, such as serverless application code to identify lexical features used in the serverless application 151. In the example of FIG. 1, the lexical analyzer 150 identifies keywords 111-119 in serverless application information 110. The lexical analyzer 150 may then compare the identified lexical features (e.g., keywords 111-119) from the serverless application 151 with the syntax information 120. For example, the lexical analyzer 150 may compare the identified lexical features (e.g., keywords 111-119) with the portable syntax information 121 and/or the non-portable syntax information 122. In some examples, if an identified lexical feature from the serverless application 151 matches, or is otherwise indicated by, a lexical feature of the portable syntax information 121, then the lexical analyzer 150 may determine that the identified lexical feature is portable. For example, in some cases, the portable syntax information 121 may include a list of keywords that are portable between execution environments. If an identified keyword in the serverless application information 110 matches a keyword included in the list of portable keywords, then the lexical analyzer tool may determine that the identified keyword is portable. By contrast, if an identified lexical feature from the serverless application matches, or is otherwise indicated by, a lexical feature of the non-portable syntax information, then the lexical analyzer 150 may determine that the identified lexical feature is non-portable. For example, in some cases, the non-portable syntax information 122 may include a list of keywords that are non-portable between execution environments. If an identified keyword in the serverless application information 110 matches a keyword included in the list of non-portable keywords, then the lexical analyzer 150 tool may determine that the identified keyword is non-portable.

In some examples, when parsing the serverless application information 110, the lexical analyzer 150 may identify one or more functions that are defined internally within the serverless application 151. Because they are defined internally within the context of the application code, these functions may be determined by the lexical analyzer 150 to be inherently portable. Thus, in some examples, these internally defined functions may be included in the portable syntax information 121 for the serverless application 151. For example, keywords of internally defined functions may be added to a list of portable keywords that may be included in the portable syntax information 121. Similarly, variable declarations that are included in the serverless application 151 may also be considered portable and may not be tracked by the lexical analyzer 150. In some examples, the lexical analyzer 150 may receive a text file input of the serverless application code. The lexical analyzer 150 may then identify directives, such as may be located at the top of the file, and which may indicate which libraries to bring into the processing context. A module name or class name definition may then be captured to create a parsing scope. Internally defined functions within this scope may then be added to the portable syntax information 121. The lexical analyzer 150 may then parse the application code line-by-line to identify lexical features, such as function keywords, for comparison to the syntax information 120. The lexical analyzer 150 may then attempt to match the identified function keywords to portable syntax information 121 and/or non-portable syntax information 122. For example, function keywords that match a keyword included in a list of portable keywords (or that do not match any keywords in a list of non-portable keywords) may be determined to be portable. By contrast, function keywords that do not match any keyword included in a list of portable keywords (or that match a keyword in a list of non-portable keywords) may be determined to be non-portable.

Figure 2:
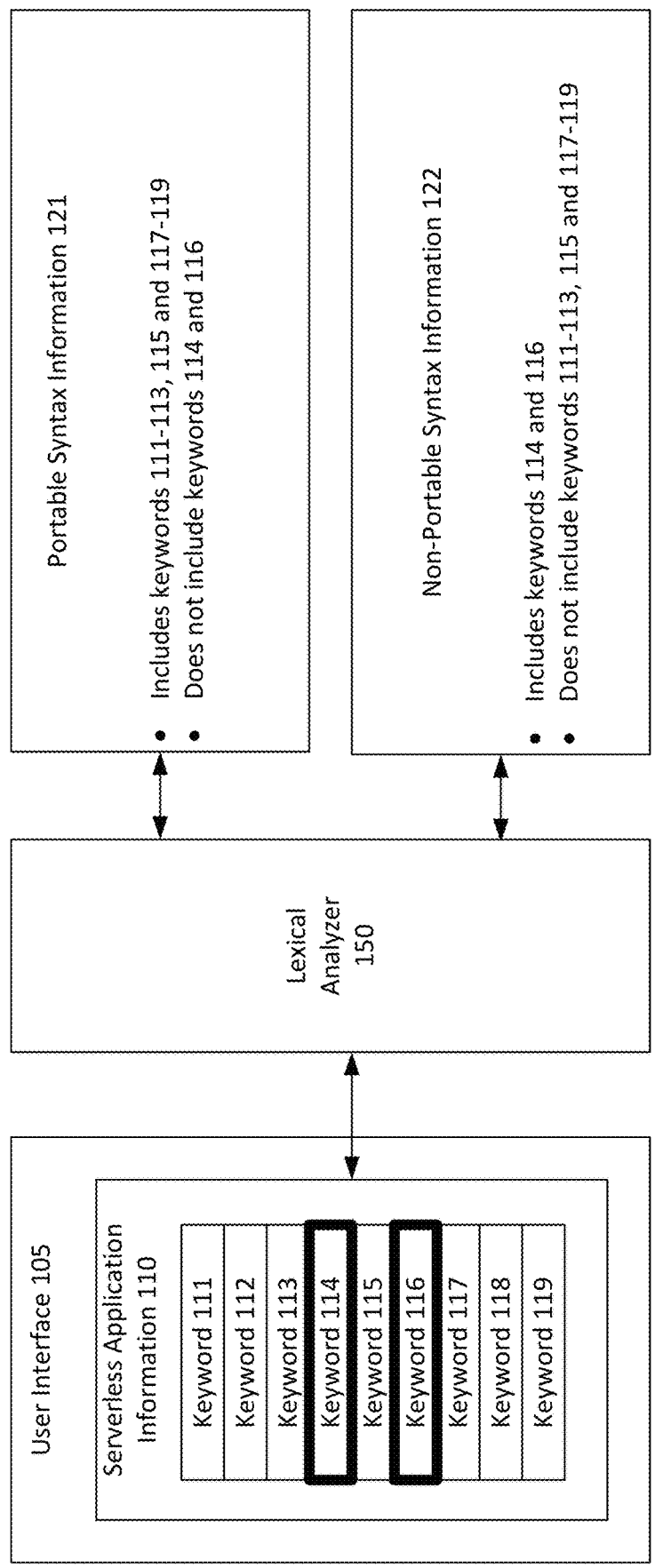
FIG. 2 is a diagram illustrating example alerting of non-portable lexical features that may be used in accordance with the present disclosure.

The lexical analyzer 150 may provide indications of which lexical features of the serverless application 151 are portable and/or non-portable. Feedback may then be provided to a user, for example via user interface 105, to indicate which lexical features of the serverless application 151 are portable and/or non-portable. For example, visual indications, such as highlighting, bold text, underlining, etc., may be provided to indicate which lexical features of the serverless application 151 are portable and/or non-portable. Referring now to FIG. 2, example alerts of non-portable lexical features will now be described in detail. In the example of FIG. 2, keywords 111-113, 115 and 117-119 are determined by the lexical analyzer 150 to be portable. As shown in FIG. 2, portable syntax information 121 includes each of keywords 111-113, 115 and 117-119. Thus, in this example, the lexical analyzer matches keywords 111-113, 115 and 117-119 from the serverless application information 110 to keywords that are included the portable syntax information 121. As also shown in FIG. 2, non-portable syntax information 122 does not include any of keywords 111-113, 115 and 117-119. Thus, in this example, the lexical analyzer 150 fails to match keywords 111-113, 115 and 117-119 to keywords that are included the portable syntax information 121. Based on these results, the lexical analyzer 150 determines that keywords 111-113, 115 and 117-119 are portable.

Additionally, in the example of FIG. 2, keywords 114 and 116 are determined by the lexical analyzer 150 to be non-portable. As shown in FIG. 2, portable syntax information 121 does not include keyword 114 or keyword 116. Thus, in this example, the lexical analyzer fails to match keywords 114 and 116 from the serverless application information 110 to keywords that are included the portable syntax information 121. As also shown in FIG. 2, non-portable syntax information 122 does includes keywords 114 and 116. Thus, in this example, the lexical analyzer 150 matches keywords 114 and 116 to keywords that are included the non-portable syntax information 122. Based on these results, the lexical analyzer 150 determines that keywords 114 and 116 are non-portable.

In the example of FIG. 2, based on the determination by the lexical analyzer 150 that keywords 114 and 116 are non-portable, the user interface 105 displays an alert to a user that keywords 114 and 116 are non-portable. Specifically, in FIG. 2, keywords 114 and 116 are shown with bold text in thick bold boxes to indicate that they are non-portable keywords. It is noted that other visual indications, such as colored highlighting, underlining, etc., may also be employed to provide an alert or other indication of non-portable lexical features. This feedback may, for example, assist in alerting developers when portions of the serverless application code are non-portable. In some examples, the developer may then attempt to replace these non-portable portions of the serverless application code with replacement code that is more likely to be portable between vendors. In some cases, the lexical analyzer 150 may provide a recommendation relating to replacement code that may be used, such as a recommendation of related keywords are other lexical features that are known to be portable. In yet other examples, the developer may choose to not to replace certain vendor-specific features that are indicated by the lexical analysis tool. In one specific example, when the lexical analyzer 150 indicates non-portable features of the code, the developer may choose to segregate the non-portable features in a common section of the code, such that the features may be easily identified and replaced at a later time if the serverless application is eventually moved to a different vendor.

In some examples, it may be unclear whether a given keyword in a serverless application is portable or non-portable. For example, in some cases, the lexical analyzer 150 may be unable to match a given keyword to any keywords in the portable syntax information 121 or the non-portable syntax information 122. In this scenario, the keyword may be considered indeterminate, meaning that there is not enough available information to determine whether the keyword is portable or non-portable. In some examples, certain designated feedback may be provided to the user to indicate that a given keyword is indeterminate, such as a question mark, a caution sign, and the like. In some examples, the user could decide to submit an indeterminate keyword for reevaluation at a later time, such as when new or additional information may become available to the lexical analyzer 150 to assist in evaluating the keyword.

Thus, the lexical analysis techniques described above with reference to FIGS. 1-2 may be employed to assist in creation of portable serverless applications. In addition to these lexical analysis techniques, various application transfer techniques are also described herein, such as to assist in transferring a portable serverless application between execution environments, for example from one vendor to another. Specifically, the application transfer techniques described herein may assist in exporting a portable serverless application to a container format, such as may allow the portable serverless application to be executed in association with multiple different cloud computing platforms, thereby allowing transfer of the portable serverless application between execution environments. Moreover, in some examples, the techniques described herein may assist in allowing a portable serverless application in a container format to execute in a container orchestration framework, thereby improving the efficiency of execution of the portable serverless application.

Figure 3:
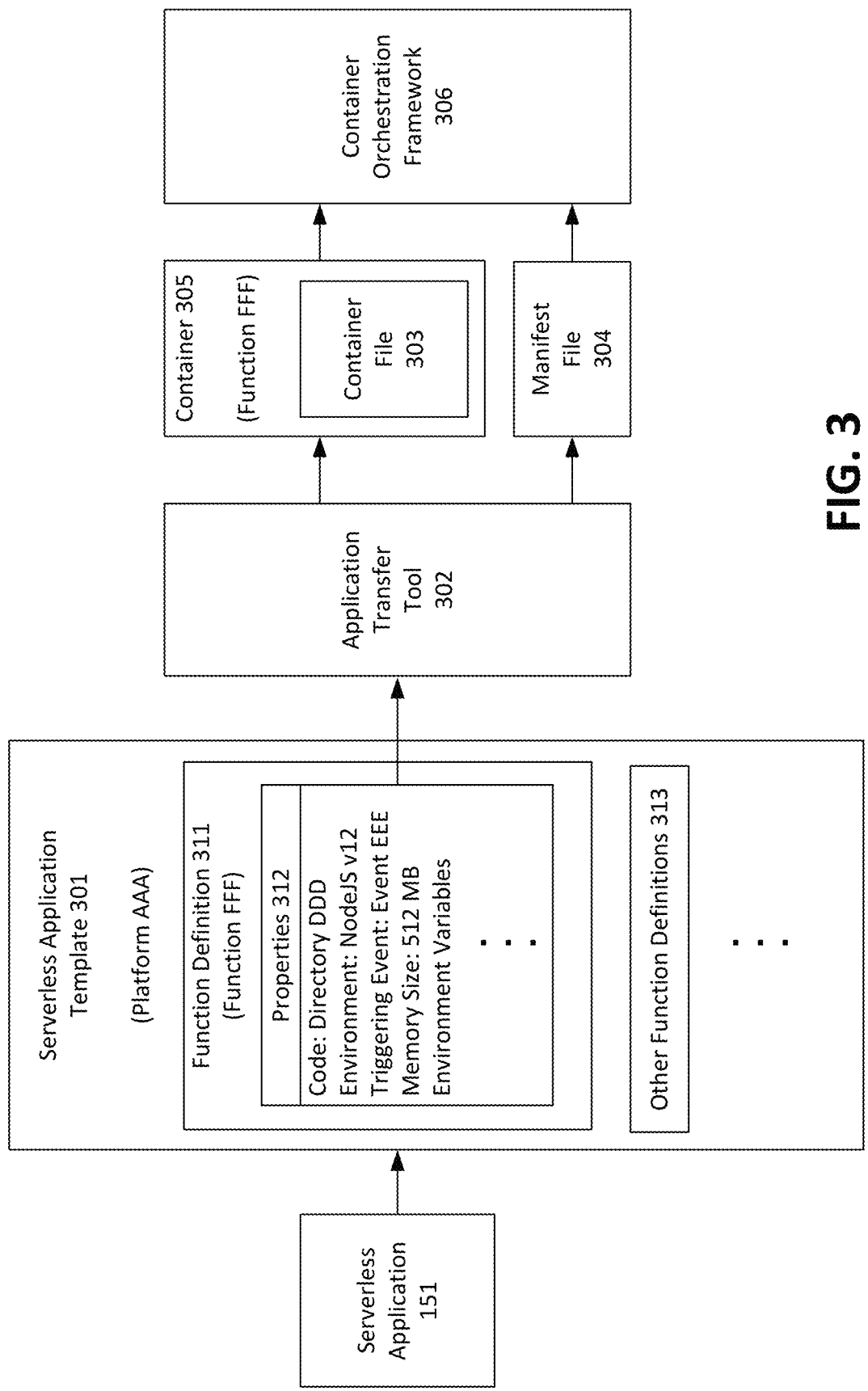
FIG. 3 is a diagram illustrating an example serverless application transfer system that may be used in accordance with the present disclosure.

Referring now to FIG. 3, an example serverless application transfer system will now be described in detail. As shown in FIG. 3, an application transfer tool 102 may be provided that may assist in converting the serverless application 151 into a container format. In some cases, the serverless application 151 may be implemented using a plurality of containers, with each container being used to implement a respective serverless function of the serverless application. In some examples, when a customer is ready to transfer serverless application 151 between execution environments, the customer may employ the application transfer tool 102 to convert the serverless application 151 to a container format. In the example of FIG. 3, the application transfer tool 302 creates a container file 303 corresponding to Function FFF, which is a serverless function of the serverless application 151. The container file 303 executes in container 305, which also corresponds to Function FFF. The application transfer tool 302 may also create any number of other container files (not shown in FIG. 3) that execute in any number of other containers (not shown in FIG. 3) corresponding to other serverless functions of the serverless application 151. The application transfer tool 102 may create the container files, including container file 303, based on a serverless application template 301 corresponding to the serverless application 151. In the example of FIG. 3, the serverless application template 301 has a format that is specific to Platform AAA.

The application transfer tool 302 may read the serverless application template 301 to identify a function definition 311 for Function FFF. The application transfer tool 302 may also read the serverless application template 301 to identify other function definitions 313 for other serverless functions of the serverless application. As shown in FIG. 3, the function definition 311 specifies properties 312 of Function FFF. In the example of FIG. 3, the properties 312 include source code information (referred to as "Code" in FIG. 3), runtime environment (referred to as "Environment" in FIG. 3), source code information, triggering event, memory size, environment variables, and any number of other properties. The application transfer tool 302 may create container file 303 for Function FFF based at least in part on these definitions. Specifically, as shown in FIG. 3, function definition 311 specifies a given type of runtime environment (NodeJS, version 12) for Function FFF. Based on this property, application transfer tool 302 may employ a container image having the specified type of runtime environment (NodeJS, version 12) as a base image for the container file 303. Additionally, function definition 311 specifies a given location (Directory DDD) in which source code for Function FFF is located. Based on this property, application transfer tool 302 may include a reference to the specified source code location (Directory DDD) in the container file 303. In some examples, the function definition 311 may also specify inline code. Additionally, function definition 311 specifies a given triggering event (Event EEE) for Function FFF. Based on this property, the application transfer tool 302 may provide an indication of the specified triggering event (Event EEE) in the container file 303. The application transfer tool 302 may also provide, in the container file 303, indications of any environment variables that may be indicated in function definition 311. For example, for environment variables, the application transfer tool 302 may identify the environment variable keys from the serverless application template 301. In some examples, the application transfer tool 302 may also identify the environment variable values from the serverless application template 301, such as when the values are provided in plain text. In other examples, the environment variable values may be provided to the application transfer tool 302 by a user.

In the example of FIG. 3, the application transfer tool 302 also assists in allowing serverless application 151, when converted into a container format, to execute in a container orchestration framework 306. Specifically, the application transfer tool 302 creates a manifest file 304 corresponding to container file 303 and container 305 for Function FFF. The application transfer tool 302 may also create any number of other manifest files (not shown in FIG. 3) corresponding to other container files and containers for other serverless functions of the serverless application 151. Manifest file 304 assists in describing execution characteristics for container 305, including container file 303, in the context of container orchestration framework 306. The manifest file 304 may be written in a data serialization language. The manifest file 304 may describe execution characteristics of a container 305, such as central processing unit (CPU) and other processing requirements, memory requirements, network configuration requirements, storage requirements, and other requirements of the container.

In some examples, the memory requirements may be specified in the serverless application template 301 and may be determined by the application transfer tool 302 based on the serverless application template 301. In the example of FIG. 1, function definition 311 indicates that Function FFF requires 512 MB of memory, and this value may be indicated in the manifest file 304. The application transfer tool 102 may infer processing requirements of the container 305 based at least in part on the memory, such as by allocating higher processing requirements to serverless functions with higher memory requirements, for example in a proportional or approximately proportional manner. For example, 512 MB of required memory could result in an allocation of 0.5 cores of CPU, while 1024 MB of required memory result in an allocation of 1 core, and so on. In some examples, the application transfer tool 302 may allocate a default storage value of 500 MB to the container 305, as this is a common storage value allocated for serverless functions. Additionally, in some examples, the application transfer tool 302 may specify, in the manifest file 304, a network configuration, such as an indication of ports with which to communicate with the container 305, for example for purposes of invoking Function FFF. In some examples, the application transfer tool 302 may select standard hypertext transfer protocol (HTTP) ports eighty and four-hundred-forty-three or may otherwise select alternative ports, such as based on a user-selection.

Figure 4:
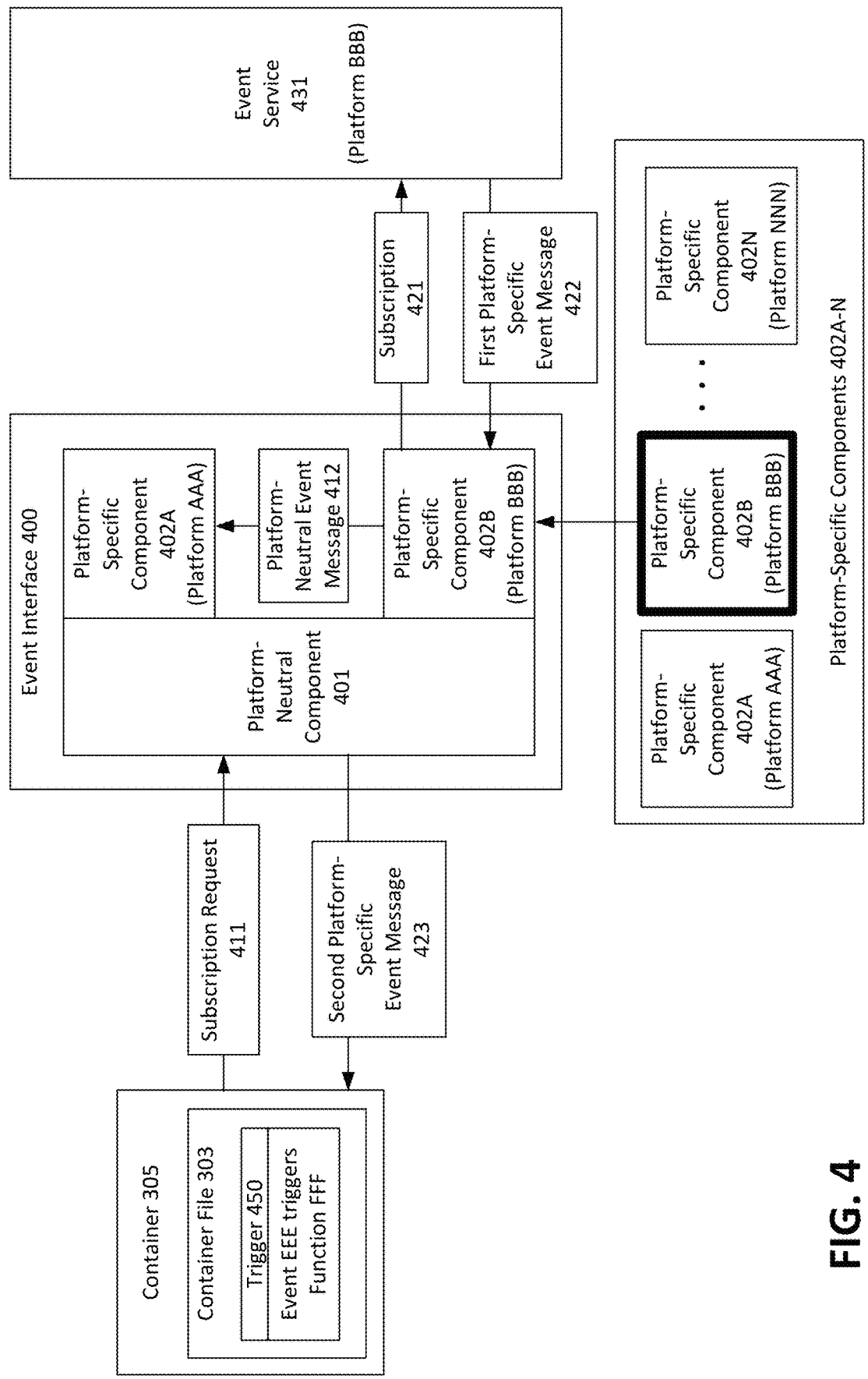
FIG. 4 is a diagram illustrating a first example event notification interface configuration that may be used in accordance with the present disclosure.
Figure 5:
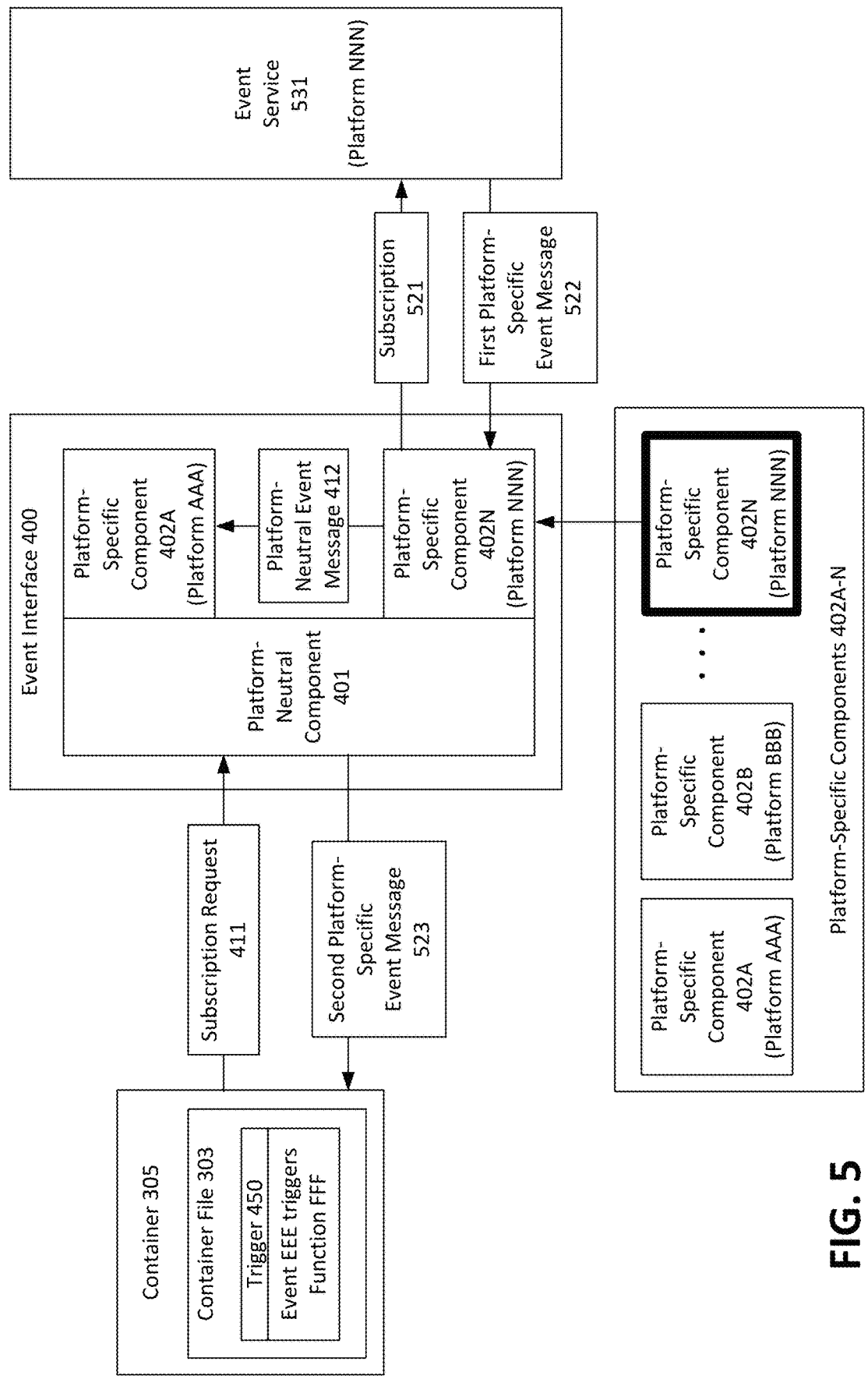
FIG. 5 is a diagram illustrating a second example event notification interface configuration that may be used in accordance with the present disclosure.

Referring now to FIGS. 4-5, some example event notification interface configurations will now be described in detail. Specifically, FIGS. 4-5 show an event interface 400 that allows container 305 and container file 303 to be notified of occurrences of Event EEE, which triggers execution of Function FFF. Various cloud computing platforms may provide event notification services that may provide notifications of these triggering events. Traditional serverless applications that are designed for a specific cloud computing platform may typically subscribe to an event notification service of that specific platform to receive notifications of triggering events. However, unlike traditional serverless applications that are designed for a specific cloud computing platform, the ability of a container to directly communicate with specific event notification services of specific computing platforms may be limited. For these and other reasons, event interface 400 allows the container 305 and container file 303 to be notified of occurrences of Event EEE, which, as indicated by trigger 450, triggers execution of event FFF.

In the example of FIG. 4, the container 305 interacts with a computing platform referred to as Platform BBB. For example, serverless application 151 may be originally designed for execution on Platform AAA, which is a native computing platform for the serverless application 151. A customer may transfer serverless application 151 from Platform AAA to Platform BBB by employing application transfer tool of FIG. 3 to convert computing application to a container format that includes container file 303 (for Function FFF) as well as other containers for other serverless functions. These containers may then allow the serverless application 151 to execute on Platform BBB. In order to trigger Function FFF, container 305 may request to receive notifications of Event EEE. On Platform BBB, the notifications of Event EEE may be provided event service 431, which is an event notification service for Platform BBB. However, for the reasons described above, container 305 may be unable to receive event notifications directly from event service 431. Thus, event interface 400 may be employed to provide the event notifications of Event EEE from event service 431 to container 305.

As shown in FIG. 4, the event interface 400 includes a platform-neutral component 401, which communicates with the container 305. The event interface 400 also includes platform-specific component 402B, which corresponds to Platform BBB and communicates with the event service 431. Furthermore, the event interface 400 includes platform-specific component 402A, which corresponds Platform AAA (the native platform for which serverless application 151 was originally designed). Platform-specific components 402A and 402B may plug-in, or otherwise connect, to the platform-neutral component 401. As shown in FIG. 4, multiple different platform-specific components, such as platform-specific components 402A-N, may be developed for multiple different respective platforms. For example, platform-specific component 402A corresponds to Platform AAA, platform-specific component 402B corresponds to Platform BBB, and platform-specific component 402N corresponds to Platform NNN. In the example of FIG. 4, platform-specific component 402B is selected from platform-specific components 402A-N to enable communication between the event interface 400 and the specific platform (Platform BBB) with which the container 305 will interact. Additionally, platform-specific component 402A is selected from platform-specific components 402A-N to match the native computing platform for which serverless application 151 was originally designed.

The platform-neutral component 401 receives, from container 305, a subscription request 411 to be notified of occurrences of Event EEE. Subscription request 411 may have a platform-neutral format, such as a special custom format that corresponds to the platform-neutral component 401 and not to any specific platform. The platform-neutral component 401 may forward the subscription request 411 to platform-specific component 402B, which may then, based on subscription request 411, initiate a subscription 421 to receive notifications of Event EEE from event service 431. When Event EEE occurs, a first platform-specific event message 422 that indicates the occurrence of the Event EEE may be sent from event service 431 to the platform-specific component 402B. The first platform-specific event message 422 may be in a format corresponding to Platform BBB. The first platform-specific event message 422 may include information about the event occurrence, such as a time, location, related resource information, and the like. Upon receipt of the first platform-specific event message 422, the platform-specific component 402B may convert the first platform-specific event message 422 into a platform-neutral event message 412. This conversion process may include encapsulation and isolation of platform-specific details in the first platform-specific event message 422. The platform-neutral event message 412 may be in a platform-neutral format, such as a special custom format that corresponds to the platform-neutral component 401 and not to any specific platform. The platform-specific component 402A may then convert the platform-neutral event message 412 into a second platform-specific event message 423 corresponding to Platform AAA, which is the native computing platform for which serverless application 151 was originally designed. The use of the format corresponding to the native computing platform of the serverless application 151 may allow the container file 303 in the container 305 to read and process the second platform-specific event message 423. The platform-neutral component 401 may then provide the second platform-neutral event message 423 to the container 305. In some examples, information about which ports to use for providing the second platform-neutral event message 423 may be included in the platform-neutral component 401 or may otherwise be provided to the platform-neutral component 401. The respective serverless computing function, Function FFF, may then be triggered within the container 305 based on the occurrence of Event EEE.

Thus, a first example in which container 305 executes in association with Platform BBB is shown in FIG. 4 and described above. Referring now to FIG. 5, a second example is shown in which, instead of Platform BBB, container 305 executes in association with a different computing platform, Platform NNN. Specifically, in the example of FIG. 5, event interface 400 includes platform-specific component 402N, which corresponds to platform NNN. In the example of FIG. 5, platform-specific component 402N is selected from platform-specific components 402A-N to enable communication between the event interface 400 and the specific platform (Platform NNN) with which the container 305 will interact. Based on subscription request 411, platform-specific component 402N initiates a subscription 521 to receive notifications of Event EEE from event service 531, which is an event notification service for Platform NNN. When Event EEE occurs, a first platform-specific event message 522 that indicates the occurrence of the Event EEE may be sent from event service 531 to the platform-specific component 402N. The first platform-specific event message 522 may be in a format corresponding to Platform NNN. The first platform-specific event message 522 may include information about the event occurrence, such as a time, location, resource information, and the like. Upon receipt of the first platform-specific event message 522, the platform-specific component 402N may convert the first platform-specific event message 522 into a platform-neutral event message 412. This conversion process may include encapsulation and isolation of platform-specific details in the first platform-specific event message 522. The platform-neutral event message 412 may be in a platform-neutral format, such as a special custom format that corresponds to the platform-neutral component 401 and not to any specific platform. The platform-specific component 402A may then convert the platform-neutral event message 412 into a second platform-specific event message 523 corresponding to Platform AAA, which is the native computing platform for which serverless application 151 was originally designed. The use of the format corresponding to the native computing platform of the serverless application 151 may allow the container file 303 in the container 305 to read and process the second platform-specific event message 423. The platform-neutral component 401 may then provide the second platform-neutral event message 523 to the container 305. The respective serverless computing function, Function FFF, may then be triggered within the container 305 based on the occurrence of Event EEE.

Figure 6:
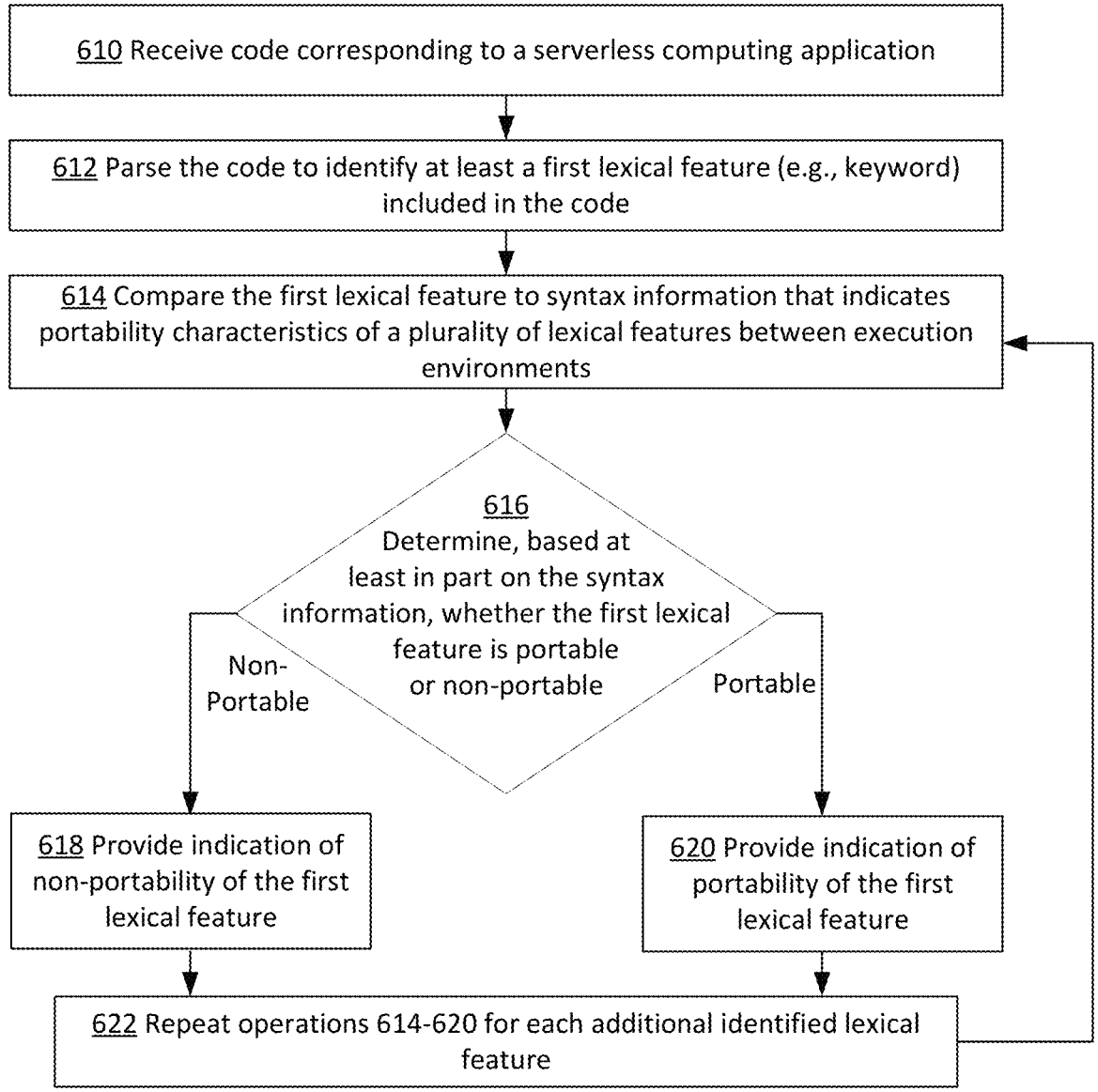
FIG. 6 is a flowchart illustrating an example process for creating a portable serverless application that may be used in accordance with the present disclosure.

FIG. 6 is a flowchart illustrating an example process for creating a portable serverless application that may be used in accordance with the present disclosure. Any or all of operations 610-622 may be performed by a lexical analyzer, which may be exposed, for example, as a web service. The process of FIG. 6 is initiated at operation 610, at which code corresponding to a serverless computing application is received. In some examples, the code may be received by a lexical analyzer in the form of a text file. In some cases, the code may be displayed to a user via a user interface, and the text file may be generated based on the code that is displayed in the user interface. In some examples, the serverless computing application may be under development in an integrated development environment. Also, in some examples, the code may be received from an automated software delivery pipeline.

At operation 612, the code is parsed to identify at least a first lexical feature (e.g., keyword) included in the code. In some examples, the lexical analyzer may receive a text file input of the serverless application code. The lexical analyzer 160 may then identify directives, such as may be located at the top of the file, and which may indicate which libraries to bring into the processing context. A module name or class name definition may then be captured to create a parsing scope. Internally defined functions within this scope may then be added to the portable syntax information. The lexical analyzer may then parse the application code line-by-line to identify lexical features, such as function keywords, for comparison to the syntax information.

At operation 614, the first lexical feature is compared to syntax information that indicates portability characteristics of a plurality of lexical features (e.g., keywords) between execution environments. In some examples, this comparison may be performed by the lexical analyzer. The syntax information may include portable syntax information and/or non-portable syntax information. For example, the syntax information may include a list of portable lexical features (e.g., keywords) of the plurality of lexical features that are portable between execution environments and/or a list of non-portable lexical features (e.g., keywords) of the plurality of lexical features that are non-portable between execution environments. The list of portable lexical features may be compiled based at least in part on semantics of platform-neutral computing languages, while the list of non-portable lexical features may be compiled based at least in part on platform-specific semantics. The lexical analyzer may compare the first lexical feature to the list of portable lexical features (or other portable syntax information) and to the list of non-portable lexical features (or other non-portable syntax information). In some examples, the lexical analyzer may determine one or more internally-defined lexical features associated with functions that are defined internally within the code of the serverless computing function. These internally defined lexical features may be considered inherently portable. The lexical analyzer may then add the one or more internally-defined lexical features to the list of portable lexical features.

At operation 616, it is determined, based at least in part on the syntax information, whether the first lexical feature is portable or non-portable between the execution environments. For example, operation 616 may include determining that the first lexical feature is included in a list of portable lexical features and/or is not included in a list of non-portable lexical features. In some examples, when the first lexical feature is included in a list of portable lexical features and/or is not included in a list of non-portable lexical features, it may be determined that the first lexical feature is portable between execution environments. By contrast, operation 616 may include determining that the first lexical feature is not included in a list of portable lexical features and/or not included in a list of non-portable lexical features. In some examples, when the first lexical feature is not included in a list of portable lexical features and/or is included in a list of non-portable lexical features, it may be determined that the first lexical feature is non-portable between execution environments.

If, at operation 616, it is determined that the first lexical feature is non-portable between execution environments, then, at operation 618, an indication (e.g., an alert) of the non-portability of the first lexical feature may be provided. In some examples, the indication of non-portability may be a visual indication, such as highlighting, bold text, underlining, etc. In some examples, the indication may be a visual indication that is displayed in a listing of the serverless application code in a computer user interface. For example, the keyword or other lexical feature may be highlighted within the code listing or may have another visual indication applied to it within the code listing. Additionally, in some examples, the indication may be a visual alert that is displayed within an interface of an integrated development environment.

If, at operation 616, it is determined that the first lexical feature is portable between execution environments, then, at operation 620, an indication of the portability of the first lexical feature may be provided. In some examples, a listing of the serverless application code may be modified to indicate both portable and non-portable lexical features. For example, in some cases, each non-portable lexical feature in the serverless application code listing may have a visual modification (e.g., highlighting of the text) applied thereto. Additionally, each portable lexical feature may be shown with unmodified text (e.g., no highlighting of the text). In this example, the visual indication of the portable lexical feature may include displaying the portable lexical feature with unmodified text. By contrast, in an alternative example, each portable lexical feature in the serverless application code listing may have a visual modification applied thereto, such as text highlighting or any other visual modification. Additionally, each non-portable lexical feature may be shown with unmodified text. In this alternative example, the visual indication of the non-portable lexical feature may include displaying the portable lexical feature with unmodified text. Finally, at operation 622, the previous operations 614-620 may be repeated for each other identified lexical feature in the serverless application code.

Figure 7:
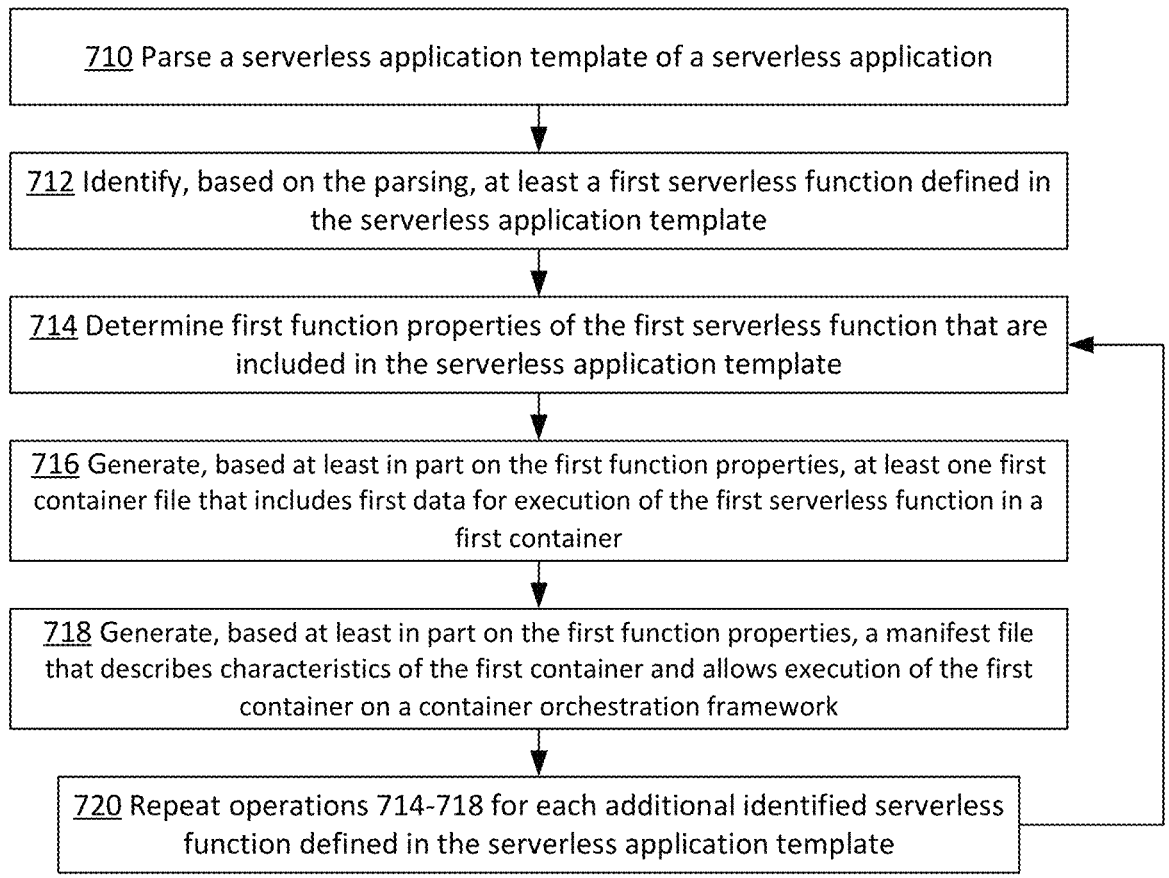
FIG. 7 is a flowchart illustrating an example process for transferring a portable serverless application to a container format that may be used in accordance with the present disclosure.

FIG. 7 is a flowchart illustrating an example process for transferring a portable serverless application to a container format that may be used in accordance with the present disclosure. In some examples, any or all of operations 710-720 may be performed by an application transfer tool as described herein. The process of FIG. 7 is initiated at operation 710, at which a serverless application template of a serverless application is parsed. As described above, in some examples, when a customer is ready to transfer a portable serverless application between execution environments, the customer may employ an application transfer tool to create container files that implement the portable serverless application. In particular, the application transfer tool may create the container files based on a serverless application template corresponding to the serverless application. The serverless application template may correspond to a first computing platform (e.g., a cloud platform or other vendor) by having a format that is specific to the first computing platform, which may be a computing platform on which the serverless application is currently executing. The application transfer tool may parse the serverless application template by reading the serverless application template to identify portions of the serverless application template in which serverless functions are defined, such as portions of the serverless application template that identify serverless functions of the serverless application and specify properties of the serverless functions, such as resource and/or property reference sections of the template.

At operation 712, at least a first serverless function defined in the serverless application template is identified based on the parsing. For example, as described above, the application transfer tool may parse the serverless application template by reading the serverless application template to identify portions of the serverless application template in which serverless functions are defined. In some examples, a function name may be specified in the serverless application for each function that may identify each function. Each function may also have its own separate group of respective function properties. At operation 714, first function properties of the first serverless function that are included in the serverless application template are determined. Operation 714 may also be performed based on the parsing of the serverless application template. In some examples, the first function properties include may include a runtime environment for the first serverless function, source code information for the first serverless function, a memory size requirement for the first serverless function, environment variable information for the first serverless function, a triggering event that triggers the first serverless function, and others. The source code information may include, for example, inline source code and/or an indication of a location in which source code for the first serverless function is stored.

At operation 716, at least one first container file that includes first data for execution of the first serverless function in a first container is generated based at least in part on the first function properties. As described above, the first container may allow portability of the first serverless function from the first computing platform to one or more other computing platforms. In some examples, the at least one first container file may correspond to the runtime environment specified in the first function properties, for example by using a container image having the specified runtime as a base. The at least one first container file may also and include the source code information, the environment variable information, and an indication of the triggering events for the first serverless function, all of which may be specified in the first function properties as described above. The execution of the first serverless function in the first container may be based on an occurrence of the triggering event.

At operation 718, a manifest file that describes characteristics of the first container and allows execution of the first container on a container orchestration framework is generated based at least in part on the first function properties. As described above, the manifest file may describe execution characteristics of a respective serverless function container, such as central processing unit (CPU) and other processing requirements, memory requirements, network configuration requirements, storage requirements, and other requirements of the container. In some examples, the manifest file may include an indication of the memory requirements that may be specified in the first function properties of the serverless application template. The processing requirements of the first container may be determined based at least in part on the memory size, and the manifest file may include an indication of the processing requirements. For example, higher processing requirements may be allocated to serverless functions with higher memory requirements, for example in a proportional or approximately proportional manner. Additionally, in some examples, the application transfer tool may specify, in the manifest file, a network configuration, such as an indication of ports with which to communicate with the container, for example for purposes of invoking serverless functions.

At operation 720, operations 714-718 may be repeated for each additional identified serverless function defined in the serverless application template. For example, a second serverless function defined in the serverless application template may be identified based on the parsing of the serverless application template. Second function properties of the second serverless function that are included in the serverless application template may be determined. At least one second container file that includes second data for execution of the second serverless function in a second container may be generated based at least in part on the second function properties. The second container may correspond to a second runtime environment included in the second function properties. A second manifest file that describes characteristics of the second container and allows execution of the second container on a container orchestration framework may be generated based at least in part on the second function properties.

In some examples, a separate container file may be created for each respective serverless function. In other examples, multiple serverless functions that have the same runtime environment may be combined into a single container. In these examples, container files may be generated for the multiple serverless functions in the manner described above, and these container files may be combined into a single container for some or all serverless functions that have the same runtime environment.

Figure 8:
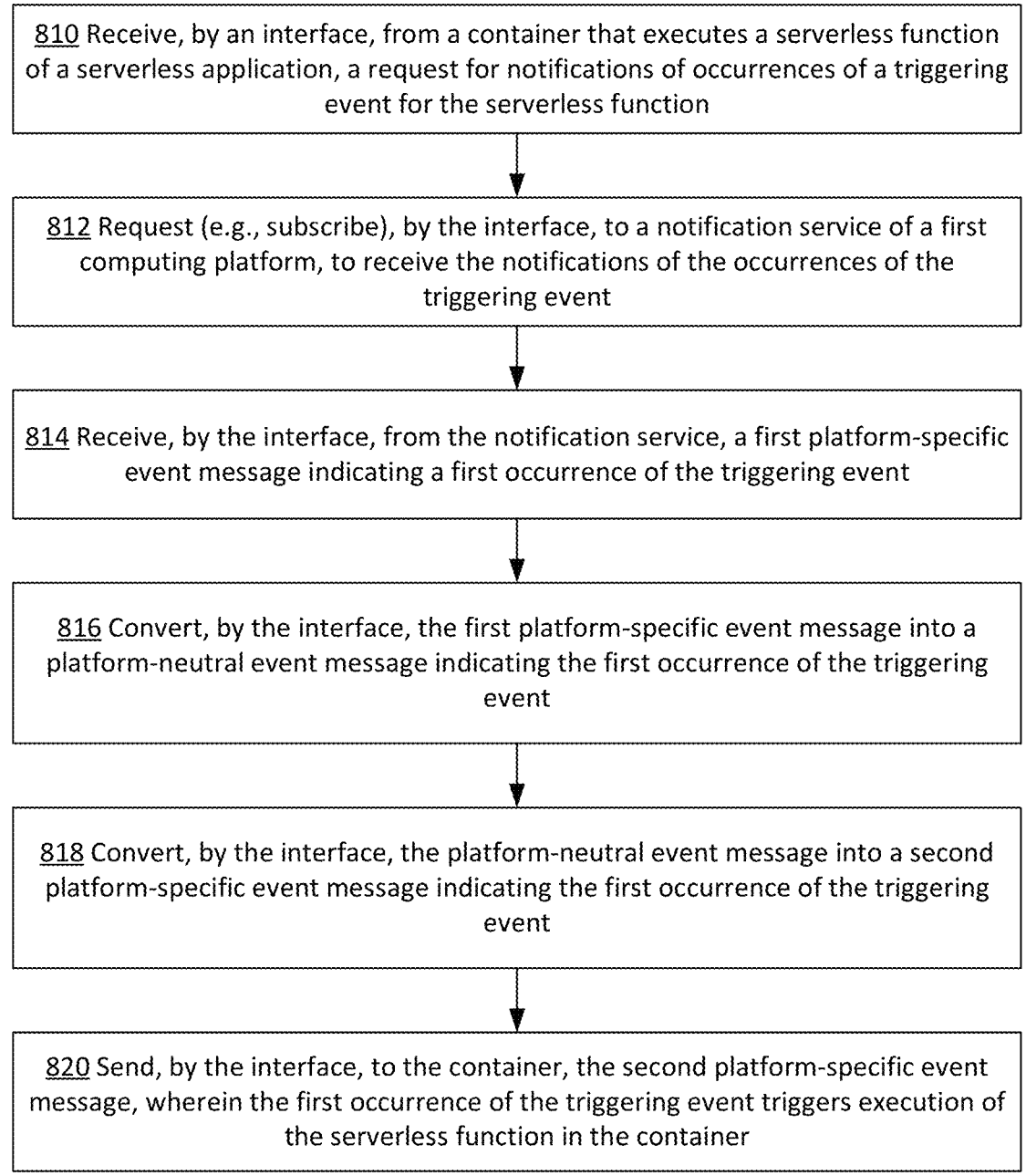
FIG. 8 is a flowchart illustrating an example process for serverless function trigger event notification that may be used in accordance with the present disclosure.

FIG. 8 is a flowchart illustrating an example process for serverless function trigger event notification that may be used in accordance with the present disclosure. The process of FIG. 8 is initiated at operation 810, at which an interface (e.g., event interface 400 of FIGS. 4-5) receives, from a container that executes a serverless function of a serverless application, a request for notifications of occurrences of a triggering event for the serverless function. In some cases, the serverless application may be implemented by a plurality of containers executing a plurality of serverless functions of the serverless application. The interface may include a platform-neutral component, a first platform-specific component, and a second platform-specific component. The first platform-specific component may correspond to a first computing platform with which the container is directly and/or indirectly interacting. For example, the first platform-specific component may be configured to communicate with the first computing platform and to convert messages between a format of the first computing platform and a neutral, or other, format. The second platform-specific component may correspond to a native computing platform for which the serverless application was originally designed. For example, the second platform-specific component may be configured to communicate with the native computing platform and to convert messages between a format of the native computing platform and a neutral, or other, format. In some examples, a plurality of platform-specific components (including the first and second platform-specific components) may be connectable to the platform-neutral component, and each of the plurality of platform-specific components may correspond to a different respective computing platform. For example, each platform-specific component may be configured to communicate with a respective computing platform and to convert messages between a format of the respective computing platform and a neutral, or other, format. The platform-neutral component may be configured to receive pluggable connections from the plurality of platform-specific components, such that any one or more of the platform-specific components may be plugged into the platform-neutral component at any given time. The first platform-specific component may be selected from the plurality of platform-specific components for inclusion in the interface to enable communication between the interface and the first computing platform. The second platform-specific component is selected from the plurality of platform-specific components for inclusion in the interface to match a native computing platform for which serverless application was originally designed. The request may be received at operation 810 by the platform-neutral component of the interface, and the request may be in a platform-neutral format, such as a special custom format that corresponds to the platform-neutral component and not to any specific platform. In some examples, when the application transfer tool creates the one or more container files for the container (e.g., as described above with reference to FIGS. 3 and 7), the application transfer tool may include, in the one or more container files, instructions for the container to request, from the interface (e.g., from the platform-neutral component), notifications of occurrences of the triggering event for the serverless function.

At operation 812, the interface may request (e.g., subscribe), to a notification service of the first computing platform, to receive the notifications of the occurrences of the triggering event. The request of operation 812 may be made by the first platform-specific component to a platform-specific event notification service of the first computing platform with which the container is interacting. At operation 814, the interface receives, from the notification service, a first platform-specific event message, which is a notification indicating a first occurrence of the triggering event. The first platform-specific event message may be received by the first platform-specific component. The first platform-specific event message may be in a first platform-specific format that corresponds to the first computing platform. The first platform-specific event message may include information about the event occurrence, such as a time, location, related resource information, and the like.

At operation 816, the interface converts the first platform-specific event message into a platform-neutral event message indicating the first occurrence of the triggering event. Operation 816 may be performed by the first platform-specific component. The platform-neutral event message may be in a platform-neutral format, such as a special custom format that corresponds to the platform-neutral component and not to any specific platform. This conversion process may include encapsulation and isolation of platform-specific details in the platform-specific event message. At operation 818, the interface converts the platform-neutral event message into a second platform-specific event message indicating the first occurrence of the triggering event. Operation 818 may be performed by a second platform-specific component that corresponds to the native computing platform for which serverless application was originally designed. The second platform-specific event message may be in a second platform-specific format corresponding to a second computing platform, which may be the native computing platform. The use of the format corresponding to the native computing platform of the serverless application may allow the container file in the container to read and process the second platform-specific event message.

In some examples, some, or all, of the information in the first platform-specific event message may not be readable by the container because the information may be in a platform-specific format that is not native to the serverless application. The conversion processes of operations 816 and 818 may include converting some, or all, of the unreadable information from a first platform-specific format that is not readable by the container (i.e., a format corresponding to the first computing platform) to a neutral format and then to a second platform-specific format that is readable by the container (i.e., a format corresponding to the serverless application's native computing format). The conversion process of operations 816 and/or 818 may also include isolating and grouping some, or all, of the unreadable information from the first platform-specific event message such that is either not sent to the container or is sent to the container in a designated section of the second platform-specific event message. This may allow the container to read and process the second platform-specific event message without causing the container to attempt to read information that it is not capable of successfully reading, thereby avoiding potential errors and delays.

At operation 820, the interface sends, to the container, the second platform-specific event message. The second platform-specific event message may be sent to the container by the platform-neutral component. The first occurrence of the triggering event may then trigger execution of the serverless function in the container.

Figure 9:
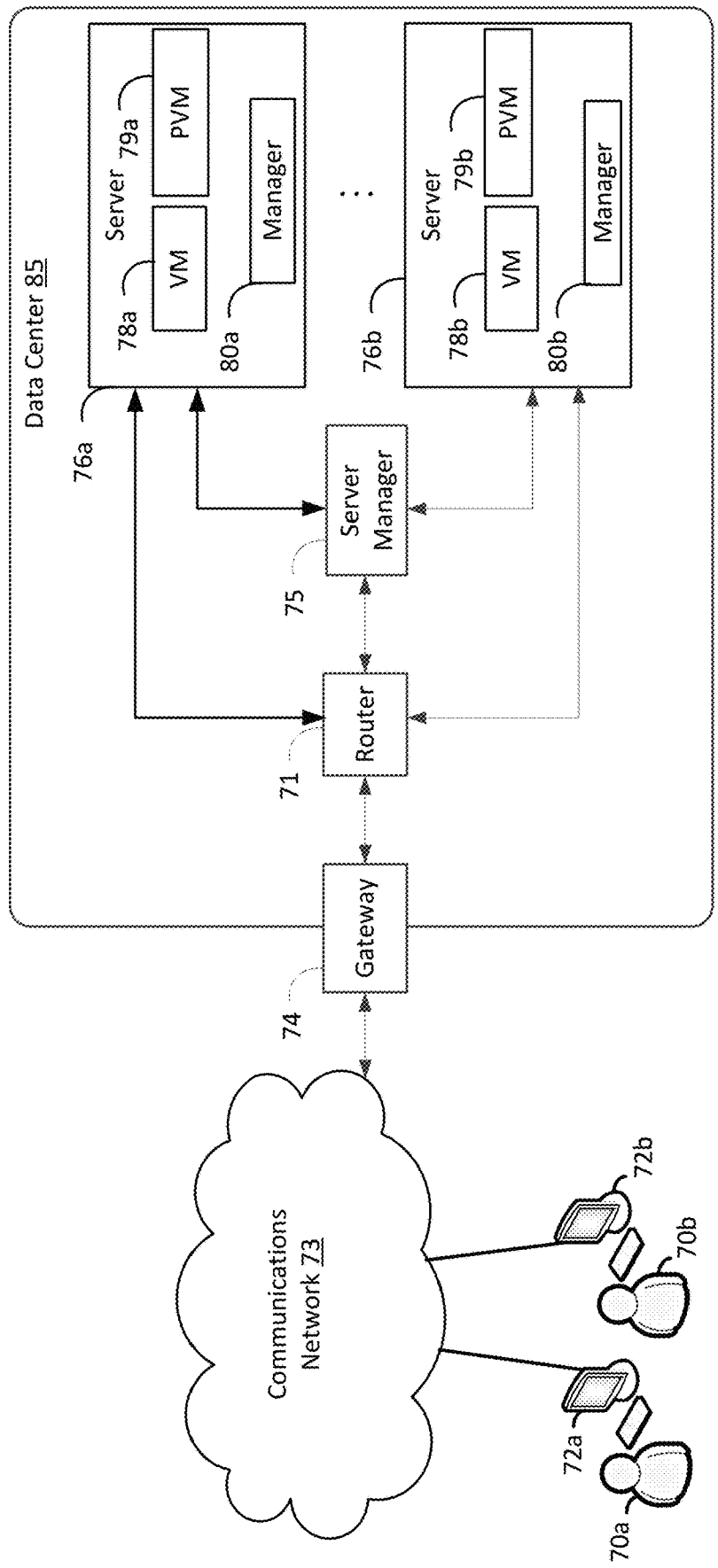
FIG. 9 is a diagram illustrating an example system for transmitting and providing data that may be used in accordance with the present disclosure.

An example system for transmitting and providing data will now be described in detail. In particular, FIG. 9 illustrates an example computing environment in which the embodiments described herein may be implemented. FIG. 9 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). Additionally, portability virtual machines (PVM's) 79a-b are virtual machine instances that are configured to perform any or all of the techniques described above associated with creating and executing portable serverless applications, such as implementing a lexical analysis tool, implementing an application transfer tool, implementing an event interface, and the like.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 9, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 9 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 9, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 9, a server manager 75 is also employed to at least in part direct various communications to, from and/or between servers 76a and 76b. While FIG. 9 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 85 described in FIG. 9 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 10:
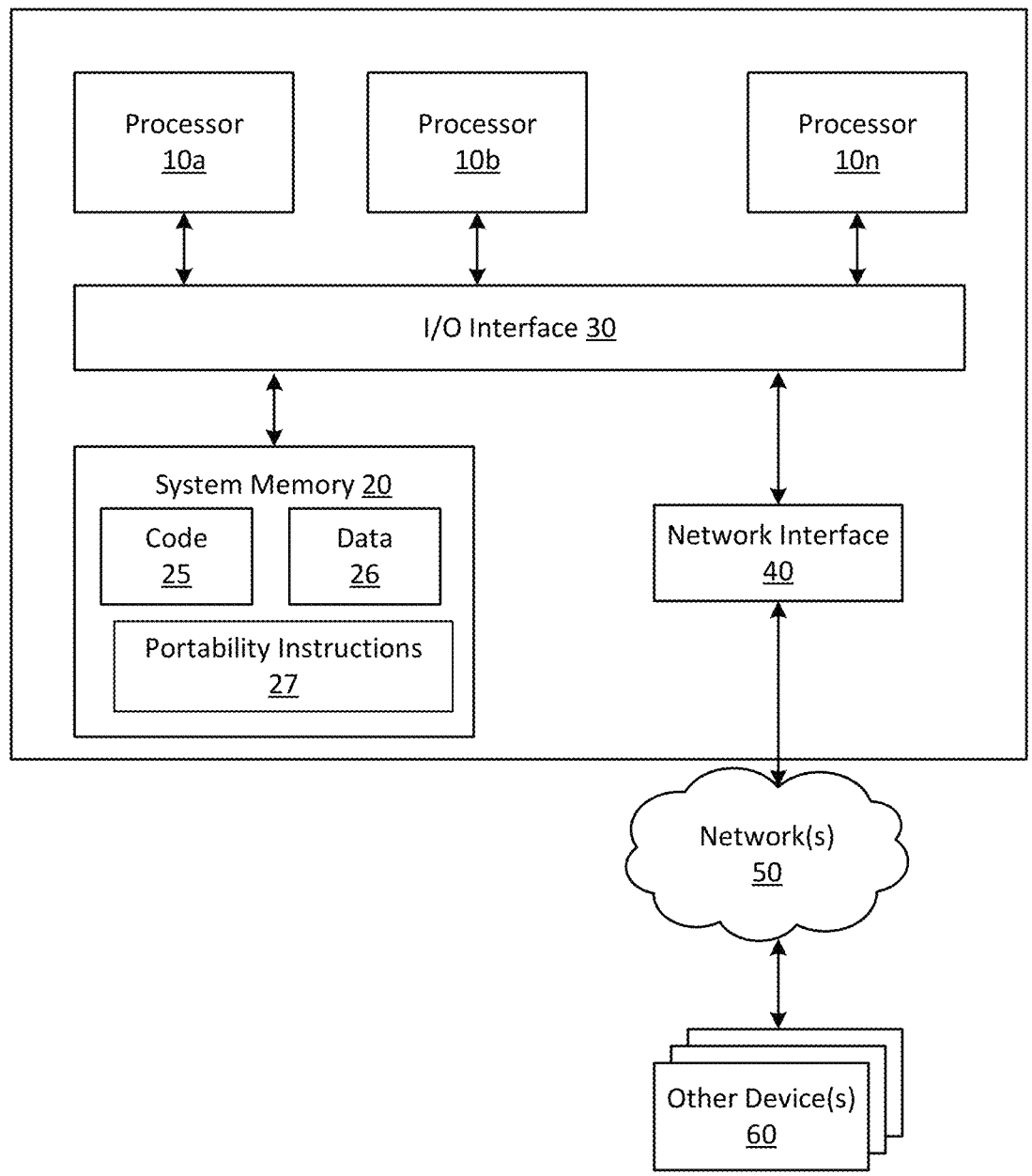
FIG. 10 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 10 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. In the example of FIG. 10, system memory 20 includes portability instructions 27, which may include computer-executable instructions for performing any or all of the techniques described above associated with creating and executing portable serverless applications, such as implementing a lexical analysis tool, implementing an application transfer tool, implementing an event interface, and the like.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
parsing a serverless application template of a serverless application, wherein the serverless application template has a format that is specific to a first cloud service vendor;
identifying, based on the parsing, at least a first serverless function defined in the serverless application template;
determining first function properties of the first serverless function that are included in the serverless application template, wherein the first function properties include a runtime environment, source code information, a memory size, and a triggering event that triggers the first serverless function;
generating, based at least in part on the first function properties, at least one first container file that includes first data for execution of the first serverless function in a first container, wherein the first container allows portability of the first serverless function to one or more other cloud service vendors, wherein the at least one first container file corresponds to the runtime environment and includes the source code information, and wherein the execution of the first serverless function in the first container is based on an occurrence of the triggering event; and
generating, based at least in part on the first function properties, a manifest file that describes characteristics of the first container and allows execution of the first container on a container orchestration framework, wherein the manifest file includes an indication of the memory size.

2. The computing system of claim 1, wherein the first function properties further include environment variable information, and wherein the at least one container file includes the environment variable information.

3. The computing system of claim 1, wherein the operations further comprise:
identifying, based on the parsing, a second serverless function defined in the serverless application template;
determining second function properties of the second serverless function that are included in the serverless application template; and
generating, based at least in part on the second function properties, at least one second container file that includes second data for execution of the second serverless function in a second container.

4. The computing system of claim 3, wherein the second container corresponds to a second runtime environment included in the second function properties.

5. A computer-implemented method comprising:
parsing a serverless application template of a serverless application, wherein the serverless application template has a format that is specific to a first computing service vendor;
identifying, based on the parsing, at least a first serverless function defined in the serverless application template;

determining first function properties of the first serverless function that are included in the serverless application template, wherein the first function properties include a runtime environment, source code information, and a triggering event that triggers the first serverless function; and generating, based at least in part on the first function properties, at least one first container file that includes first data for execution of the first serverless function in a first container, wherein the first container allows portability of the first serverless function to one or more other computing service vendors, wherein the at least one first container file corresponds to the runtime environment and includes the source code information, and wherein the execution of the first serverless function in the first container is based on an occurrence of the triggering event.

6. The computer-implemented method of claim 5, further comprising:

generating, based at least in part on the first function properties, a manifest file that describes characteristics of the first container and allows execution of the first container on a container orchestration framework.

7. The computer-implemented method of claim 6, wherein the first function properties further include a memory size for the first serverless function, and wherein the manifest file includes an indication of the memory size.

8. The computer-implemented method of claim 7, further comprising:

determining, based at least in part on the memory size, processing requirements of the first container, wherein the manifest file includes an indication of the processing requirements.

9. The computer-implemented method of claim 5, wherein the first function properties further include environment variable information, and wherein the at least one container file includes the environment variable information.

10. The computer-implemented method of claim 5, further comprising:

identifying, based on the parsing, a second serverless function defined in the serverless application template;

determining second function properties of the second serverless function that are included in the serverless application template; and generating, based at least in part on the second function properties, at least one second container file that includes second data for execution of the second serverless function in a second container.

11. The computer-implemented method of claim 10, wherein the second container corresponds to a second runtime environment included in the second function properties.

12. The computer-implemented method of claim 5, wherein the source code information comprises an indication of a location in which source code for the first serverless function is stored.

13. One or more non-transitory computer-readable storage media having stored thereon computing instructions that, upon execution by one or more computing devices, cause the one or more computing devices to perform operations comprising:

parsing a serverless application template of a serverless application, wherein the serverless application template has a format that is specific to a first computing service vendor;

identifying, based on the parsing, at least a first serverless function and a second serverless function defined in the serverless application template;

determining first function properties of the first serverless function that are included in the serverless application template, wherein the first function properties include a first runtime environment;

generating, based at least in part on the first function properties, at least one first container file that includes first data for execution of the first serverless function in a first container, wherein the at least one first container file corresponds to the first runtime environment, and wherein the first container allows portability of the first serverless function to one or more other computing service vendors;

determining second function properties of the second serverless function that are included in the serverless application template, wherein the second function properties include a second runtime environment; and generating, based at least in part on the second function properties, at least one second container file that includes second data for execution of the second serverless function in a second container, wherein the at least one second container file corresponds to the second runtime environment.

14. The one or more non-transitory computer-readable storage media of claim 13, wherein the operations further comprise:

generating, based at least in part on the first function properties, a manifest file that describes characteristics of the first container and allows execution of the first container on a container orchestration framework.

15. The one or more non-transitory computer-readable storage media of claim 14, wherein the first function properties further include a memory size for the first serverless function, and wherein the manifest file includes an indication of the memory size.

16. The one or more non-transitory computer-readable storage media of claim 15, wherein the operations further comprise:

determining, based at least in part on the memory size, processing requirements of the first container, wherein the manifest file includes an indication of the processing requirements.

17. The one or more non-transitory computer-readable storage media of claim 13, wherein the first function properties further include environment variable information, and wherein the at least one container file include the environment variable information.

18. The one or more non-transitory computer-readable storage media of claim 13, wherein the first function properties further include source code information, and wherein the at least one container file includes the source code information.

19. The one or more non-transitory computer-readable storage media of claim 13, wherein the first function properties further include a triggering event that triggers the first serverless function, and wherein the execution of the first serverless function in the first container is based on an occurrence of the triggering event.

* * * * *